Patented Mar. 9, 1943

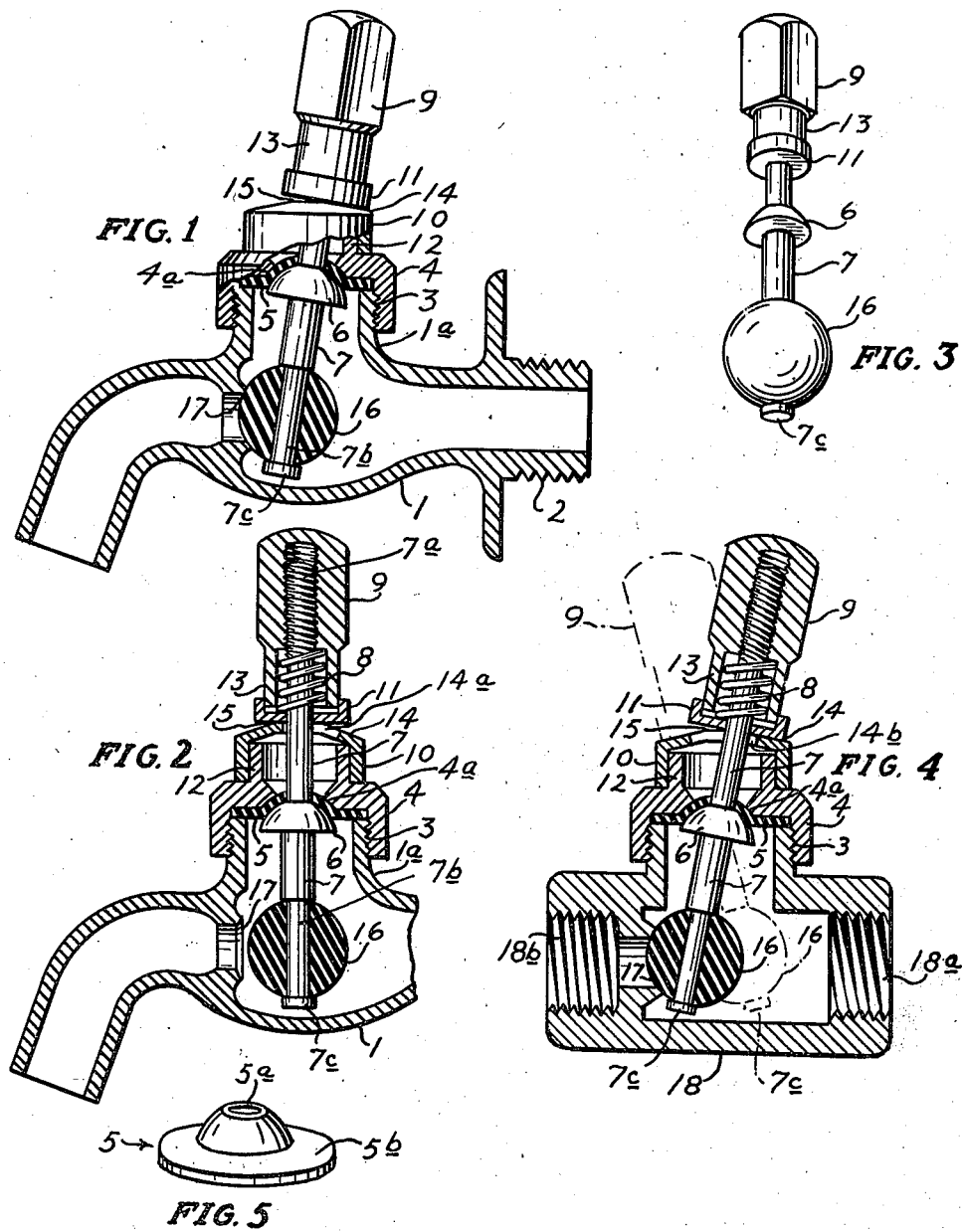

2,313,128

UNITED STATES PATENT OFFICE 2,313,128

FLUID CONTROL VALVE

Ulysses G. Densten, Haddon Heights, N. J., assignor to Strong Manufacturing Company, Portland, Oreg., a corporation of Oregon Application November 18, 1940, Serial No. 366,096

5 Claims. (Cl. 251—10)

My invention relates to fluid control valves and has for its particular object the provision of a valve of this character which is quick acting, but one which when seated quickly will not produce water hammer or surge which will tend to unseat the valve element. A further object of my invention is to provide a valve of this character which will not leak, and one in which the seal for the valve is proportionate to the pressure of the fluid which it controls. A further object of my invention is to provide a valve of this character which includes a valve element which may present a number of different surfaces to its seat and thus this valve element will not become gouged out or deformed due to repeated bearing at one point on said valve.

These and other objects of my invention hereinafter pointed out are attained in a fluid control valve having a tubular body defining a transverse annular seat in its bore and a movable closure element adapted to be moved into and out of engagement with said seat. The closure element comprises a single stem the inner end of which extends into the body and carries a spherical resilient valve element rotatably mounted on said stem, and the outer end of which carries a spring-pressed retaining member. Intermediate said ends is a semispherical pivot element which engages a recessed seat in the bonnet of said valve, and a resilient sealing element surrounds said stem so that pressure exerted against said semispherical sealing element will tend to hold the latter in its seat to compress the sealing element and to prevent leakage therethrough.

The details of my invention and their mode of operation are hereinafter described with reference to the accompanying drawing in which:

Fig. 1 is an elevation of a faucet embodying my invention with portions broken away to show details of construction, in this view the valve is shown closed;

Fig. 2 is a fragmentary section of said same embodiment of my invention in which the parts have been shown moved to open the valve, in said figure all of the parts of the valve surrounding the stem are shown in section;

Fig. 3 is a perspective view of the stem assembly;

Fig. 4 is a section through a modification of my invention with the valve element shown seated and dotted lines indicate the position to which the valve stem is moved to open the valve; and Fig. 5 is a perspective view of the sealing element seated between the semispherical pivot element and its seat to prevent leakage at this point.

I have illustrated my invention as being embodied in a faucet or bib-type valve as illustrated in Figs. 1 and 2. Said valve includes a tubular body 1 having screw threads for engaging a standard pipe sleeve. The neck 1a of said body is threaded, as at 3, for engaging a removable bonnet 4. A sealing element or cupped washer 5 is clamped between the top of said neck and within said bonnet and it can be compressed by the threaded connection between the bonnet and said neck. Said sealing element or washer is preferably made of rubber or similar elastic material and is pierced as at 5a to pass valve stem 7 but to retain the semispherical pivot element 6, as is indicated in the drawing. The valve stem is adapted to be swung angularly about the center of curvature of said pivot element 6 and thus may rotate through a small angle. The provision of said sealing element thus prevents leakage around said stem.

The under side of bonnet 4 is provided with a curved recess 4a which corresponds generally in curvature to the sweep of the pivot element 6 and the sealing element is formed to correspond to said sweep and has an outstanding lateral flange 5b which may be gripped between the bonnet and the top of the neck 1a. To accommodate the said angular movement of the valve stem, I cut away said bonnet at a relatively wide angle so that the bonnet will not interfere with the angular movement of said stem. A coiled spring 8 surrounding said stem and lies within the skirt of a retaining member or handle 9 which tends to hold said pivot element tightly in position in the rounded seat and to compress the sealing element therein. The compression of said spring may be varied by screw-threading the handle 9 onto the threaded end 7a of said stem. Likewise, the parts assembled on said stem but removable therefrom can be detached by unscrewing said handle from said fitted portion 7a to permit them to be removed. Inasmuch as said stem 7 is permitted to rotate about a longitudinal axis with respect to the body, I interpose a cap 10 between the bonnet and the retaining member 9. Said cap is journalled upon an upstanding flange 12 formed upon the bonnet. I also provide a cupped disc 11 on the inner end of the handle 9 so that said disc and handle together form said retaining member and house the spring 8 therein. The skirted portion 13 of said handle is counter-bored to a larger diameter than the threaded portion for engaging the end 7a of the stem and it is within said counter-bored portion of said skirted flange 13 that the spring 8 is housed.

The upper surface of the cap 10 is provided with one or more cam faces 14. In the embodiment shown in Fig. 1 the valve is adapted to move only from a vertical position as shown in Fig. 2 to an angular or sloping position shown in Fig. 1 to move from open to close position. Thus only one cam face 14 is necessary and said cam face is slotted as at 14a to limit said movement. The upper portion of said cap is flattened as at 15 so that the stem may be held in the position it is shown to occupy in Fig. 2. That is, the under surface of the disc 11 being flat and the cam face 15 being flat and arranged perpendicular to the stem causes the stem to remain in position when two said flat surfaces are opposed. When the stem is tipped, however, in a counter-clockwise direction as the parts are indicated in Fig. 2, it will move to fully closed position, as is shown in Fig. 1, because of the engagement of said disc 11 with the cam face 14. Inasmuch as fluid being controlled tends to move the spherical valve element 16 towards its seat 17, I preferably make the compression on said spring 8 quite heavy so that the engagement of the disc on the flat face 15 will be sufficient to hold the valve open even in the presence of a large quantity of fluids flowing rapidly against and around the spherical valve element 16.

The valve element 16 is preferably journalled upon the reduced portion 7b of the stem and a head 7c at the extreme end of said stem holds said valve element in place. I preferably make said valve element 16 of rubber or some similar elastic material. If rubber would tend to become deteriorated by the fluid being handled, I preferably use some equivalent material such, for example, as the compound sold under the trade name neoprene. This is likewise true of the sealing element 5 which would be attacked by the same type of fluid.

I deem it quite important that said valve element be made of some elastic material and preferably I form said valve element to have a consistency comparable in elasticity to the banks on the sides of pool and billiard tables. This is for the reason that, with a valve element of this character, I have found that it tends to eliminate water hammer. In a water pipe, for example, these violent vibrations are somewhat difficult of analysis having to do with the mass of water or other liquids being directed through a conduit, and with the elasticity of the pipe and fittings. A pre-disposing factor usually encountered is a loose valve stem, the water hammer starting wheen the valve is open and continuing as the valve stem vibrates. I have found that the valve embodying my invention having the valve element of such elasticity as has been described does not produce water hammer even after the valve is worn. This result seemingly can be attributed to two factors. First, the material of which said valve element is made yields so readily that the natural period of the vibrations is lengthened to such an extent that they are damped out by the rest of the system, and, second, the rubber itself serves as a damping agent. When I speak of rubber I, of course, refer to any similar material which may be utilized for said valve element. The stem 7 may be rotated about a longitudinal axis and said rotation would move the valve element so that different surfaces of the valve element would be brought into contact with the valve seat 17. Because of the fact that said valve element is rotatable upon the stem it also tends to permit said sphere to move slightly even though the stem is not rotated to present new faces of the valve element to its seat. This change in position of the valve element tends to produce equal wear about its periphery and thus the valve has a long operating life. It also tends to prevent the formation of ridges or grooves in the valve element which tend to permit leakage when the valve is permitted to stand in one position for a long time and then is changed to a new position. Also because of the yieldability of said valve element, it tends to conform to the shape of the seat even though the valve element does become distorted either by pressure or by wear.

When it becomes necessary to open up said valve, this may be accomplished by unscrewing the bonnet 4 from its threaded connection 3 whereupon the entire valve stem assembly, bonnet and cap may be lifted out. Likewise the sealing element 5 can be replaced by unscrewing the handle 9 and the valve element 16 can be replaced merely by slipping the rubber member off over the head 7c and from off the narrow portion 7b, the material of which said valve element is made being sufficiently yieldable and resilient to accommodate removal and replacement.

In Fig. 4 I illustrate a slightly different type of valve structure, the tubular body being illustrated as having two threaded pipe connections, 18a and 18b. The threaded inlet connection is 18a and threaded outlet connection is 18b. In said modification I illustrate how a valve of this character can be arranged so that the stem assembly can move in two directions from vertical to open and close the valve. To this end the slot 14b in cap 14 in said modification is slotted an equal distance beyond the flattened surface 15 rather than only to one side thereof as is shown in the first embodiment. Thus the valve stem assembly can move from the position shown in full lines to the position shown in dotted lines as is shown in said Fig. 4. Otherwise said modification is identical to that shown in previous figures and similar letters of reference are given to the parts thereof.

I claim:

1. A fluid control valve having a tubular body defining a transverse annular seat about its bore, a movable closure element adapted to be moved into and out of engagement with said seat, said closure element comprising a stem, the inner end of which extends into said body, and the outer end of which lies exteriorly thereof, a spherical valve element mounted upon the inner end of said stem, a spring-pressed retaining member carried by the outer end of said stem and a semi-spherical pivot element arranged intermediate the ends of said stem, a removable bonnet for said body defining an aperture leading laterally from the bore of said body, through which aperture said stem passes, a rounded seat surrounding the inner face of said aperture for accommodating said pivot element and an elastic sealing element secured across said rounded seat, pierced to pass said stem but to retain said pivot element, said sealing element lying between said pivot element and said rounded seat, said sealing element being secured between said bonnet and said body.

2. A fluid control valve having a tubular body defining a transverse annular seat about its bore, a movable closure element adapted to be moved into and out of engagement with said seat, said closure element comprising a stem, the inner end of which extends into said body, and the outer end of which lies exteriorly thereof, a spherical valve element mounted upon the inner end of said stem, a spring-pressed retaining member carried by the outer end of said stem and a semispherical pivot element arranged intermediate the ends of said stem, a removable bonnet for said body defining an aperture leading laterally from the bore of said body, through which aperture said stem passes, a rounded seat surrounding the inner face of said aperture for accommodating said pivot element, an elastic sealing element secured across said rounded seat, pierced to pass said stem but to retain said pivot element, said sealing element lying between said pivot element and said rounded seat, a cap engaging said bonnet, said sealing element being secured between said bonnet and said body, a cam face eccentric to the semispherical pivot element formed adjacent said aperture and upon said cap in operative engagement with said retaining member, and a way of limited length formed in said cap through which said stem extends to limit the pivotal movement of said stem with respect to said cam face.

3. A fluid control valve having a tubular body defining a transverse annular seat about its bore, a pivotally mounted closure element adapted for engagement with said seat, said closure element being removably secured to said body and being retractable as a single unit therefrom, said closure element comprising a stem, the inner end of which extends into said body, and the outer end of which lies exteriorly thereof, a spherical valve element mounted directly upon the inner end of said stem, a spring-pressed retaining member carried by the outer end of said stem and a pivot element fixed to said stem and arranged intermediate the ends thereof and having a sealed ball-and-socket bearing with said retaining member, and said stem being journalled for free rotation in said retaining member.

4. A fluid control valve having a tubular body defining a transverse annular seat about its bore, a pivotally mounted closure element adapted for engagement with said seat, said closure element being screw-fitted to said body and being retractable as a single unit therefrom, said closure element comprising a stem, the inner end of which extends into said body, and the outer end of which lies exteriorly thereof, a spherical valve element journalled for free rotation upon the inner end of said stem, a spring-pressed retaining member carried by the outer end of said stem and a pivot element fixed to said stem and arranged intermediate the ends thereof and having a sealed ball-and-socket bearing with said retaining member.

5. A fluid control valve having a tubular body defining a transverse annular seat about its bore, a pivotally mounted closure element adapted for engagement with said seat, said closure element being screw-fitted to said body and being retractable as a single unit therefrom, said closure element comprising a stem, the inner end of which extends into said body, and the outer end of which lies exteriorly thereof, a spherical valve element journalled for free rotation upon the inner end of said stem, a spring-pressed retaining member carried by the outer end of said stem and a pivot element fixed to said stem and arranged intermediate the ends thereof and having a sealed ball-and-socket bearing with said retaining member, said stem being journalled for free rotation in said retaining member, and said spherical valve element and said seat having substantial resilient engagement and accommodation one with the other.

ULYSSES G. DENSTEN.